United States Patent
Croy et al.

(10) Patent No.: US 10,274,348 B2
(45) Date of Patent: Apr. 30, 2019

(54) POINTER DOUBLE ILLUMINATION

(71) Applicants: Jean Luc Croy, Cergy (FR); Sylvain Denise, Cergy (FR); Yahia Hammiche, Argenteuil (FR)

(72) Inventors: Jean Luc Croy, Cergy (FR); Sylvain Denise, Cergy (FR); Yahia Hammiche, Argenteuil (FR)

(73) Assignee: Visteon Global Technologies, INC., Van Buren Township, MI (US)

( * ) Notice: Subject to any disclaimer, the term of this patent is extended or adjusted under 35 U.S.C. 154(b) by 0 days.

(21) Appl. No.: 15/707,233

(22) Filed: Sep. 18, 2017

(65) Prior Publication Data

US 2019/0086246 A1    Mar. 21, 2019

(51) Int. Cl.
| | | |
|---|---|---|
| *B60Q 3/12* | (2017.01) | |
| *G01D 11/28* | (2006.01) | |
| *G01D 13/26* | (2006.01) | |
| *G02B 27/20* | (2006.01) | |

(52) U.S. Cl.
CPC .............. *G01D 13/265* (2013.01); *B60Q 3/12* (2017.02); *G01D 11/28* (2013.01); *G02B 27/20* (2013.01)

(58) Field of Classification Search
CPC ........ G01D 13/265; G01D 11/28; B60Q 3/14; G02B 27/20
See application file for complete search history.

(56) References Cited

U.S. PATENT DOCUMENTS

| | | | | |
|---|---|---|---|---|
| 6,302,551 B1* | 10/2001 | Matumoto | ............. | B60K 37/02 362/23.16 |
| 2004/0212977 A1* | 10/2004 | Ishii | ........ | G01D 11/28 362/23.2 |
| 2006/0215384 A1* | 9/2006 | Liu | .......... | G01D 11/28 362/23.01 |
| 2007/0035960 A1* | 2/2007 | Birman | ................. | G01D 11/28 362/489 |
| 2008/0002386 A1* | 1/2008 | Mezouari | ............... | G01D 11/28 362/23.16 |
| 2009/0147496 A1* | 6/2009 | Sziraki | .................. | B60K 37/02 362/23.2 |
| 2012/0120345 A1* | 5/2012 | Takato | ................... | B60K 37/02 349/62 |

* cited by examiner

*Primary Examiner* — Mary Ellen Bowman
(74) *Attorney, Agent, or Firm* — Quinn IP Law

(57) ABSTRACT

Disclosed herein is a mechanical instrument cluster with a lighted pointer. The light pointer is driven by either a shaft or shaft-less stepper motor, and includes applique layers that are viewable when lighted. The pointers disclosed herein are capable of illuminating with at least two colors, with a single light emitting diode (LED) with multiple colors.

20 Claims, 8 Drawing Sheets

POINTER DOUBLE ILLUMINATION

BACKGROUND

Instrument clusters in vehicles are implemented in the dashboard area, and provide information critical to operation the vehicle. For example, various metrics, such as speed, revolutions-per-minute (RPM), fuel level, and the like may be implemented.

The aesthetic feel and functionality of said instrument clusters is paramount in conveying certain important qualities, such as luxury and utility to the end user. As such, instrument cluster manufacturers provide a variety of options to the end user (i.e. driver or occupant) on the design and feel of the instrument cluster.

Traditionally, the information provided was analog and mechanical. However, in recent times, digital and electronic information has been provided. These instrument clusters include all digital, or a hybrid of digital and analog information.

One such element often used in an instrument cluster is a pointer. FIG. 1(a) illustrates a planar-view of a pointer implementation according to the prior art. As shown in FIG. 1(a), the pointer implementation includes a pointer 110 over circular plane 100. The pointer 110 rotates about an axis 120 in the center of the circular plane 100, and points at various indicia 130 on the circular plane 100.

In recent times, the pointer has been illuminated. FIG. 1(b) illustrates a side-view of an illuminated pointer 110. As shown, the pointer 110 includes a pointer shaft 111, a pointer cap 112, and a pointer stem 113.

Light is provided by a monochrome light emitting diode (LED) 140 (as shown in FIG. 1(c)). The monochrome LED 140 is embedded on a PCB 150, which also includes a stepper motor 160 that allows rotation of the pointer 110 around the axis 120.

Thus, light from the monochrome LED 140 is propagated through the pointer shaft 111 (141), reflected of a reflective surface 114 (angled so as to project the light in a 90 degree direction), and propagated through the pointer stem 113 (142). In this way, if the pointer stem 113 is provided with a see-through applique, a viewer seeing the pointer 110 in the top-view (as shown in FIG. 1(a)) may be able to see said illumination 142.

SUMMARY

The following description relates to system, methods, and pointer implementations related to providing double illumination. Exemplary embodiments may also be directed to any of the system, the method, or an applications implementing said pointer implementations in an instrument cluster context.

Disclosed herein is an instrument cluster. The instrument cluster includes a pointer shaft with a hollow portion to propagate light, the pointer shaft being rotate-able around an axis, the pointer shaft having a first end and a second, the first end fitted through a hole in a printed-circuit-board (PCB); a wall disposed within the hollow portion of the pointer shaft, the wall bisecting the pointer shaft into a first light guide and a second light guide; a pointer cap fitted on the second end of the pointer shaft, the pointer shaft have a first angled reflective surface and a second angled reflective surface, the first angled reflective surface being oriented at an opposite angle of the second angled reflective surface; a pointer tail attached to a first end of the pointer cap and a pointer stem attached to a second end of the pointer cap. The first light is projected through the first light guide is reflected off the first angled reflective surface and through the pointer tail, and a second light is projected through the second light guide is reflected off the second angled reflective surface and through the pointer stem.

Additional features of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which.

DETAILED DESCRIPTION

Figure 1A:
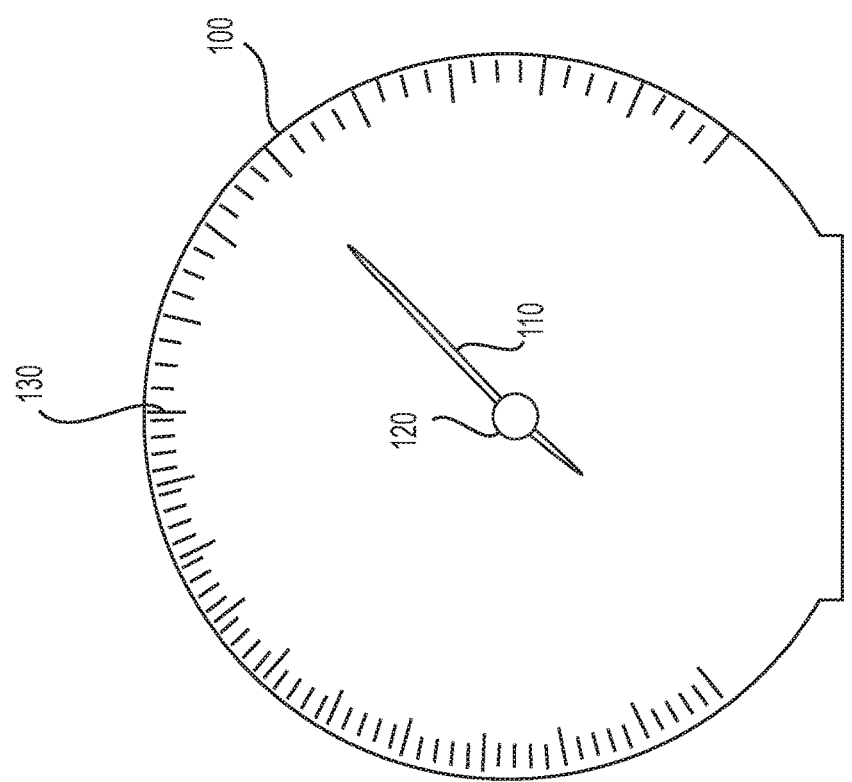
FIGS. 1(a)-(c) illustrate various views of an illuminated pointer system and a source of illumination.
Figure 1B:
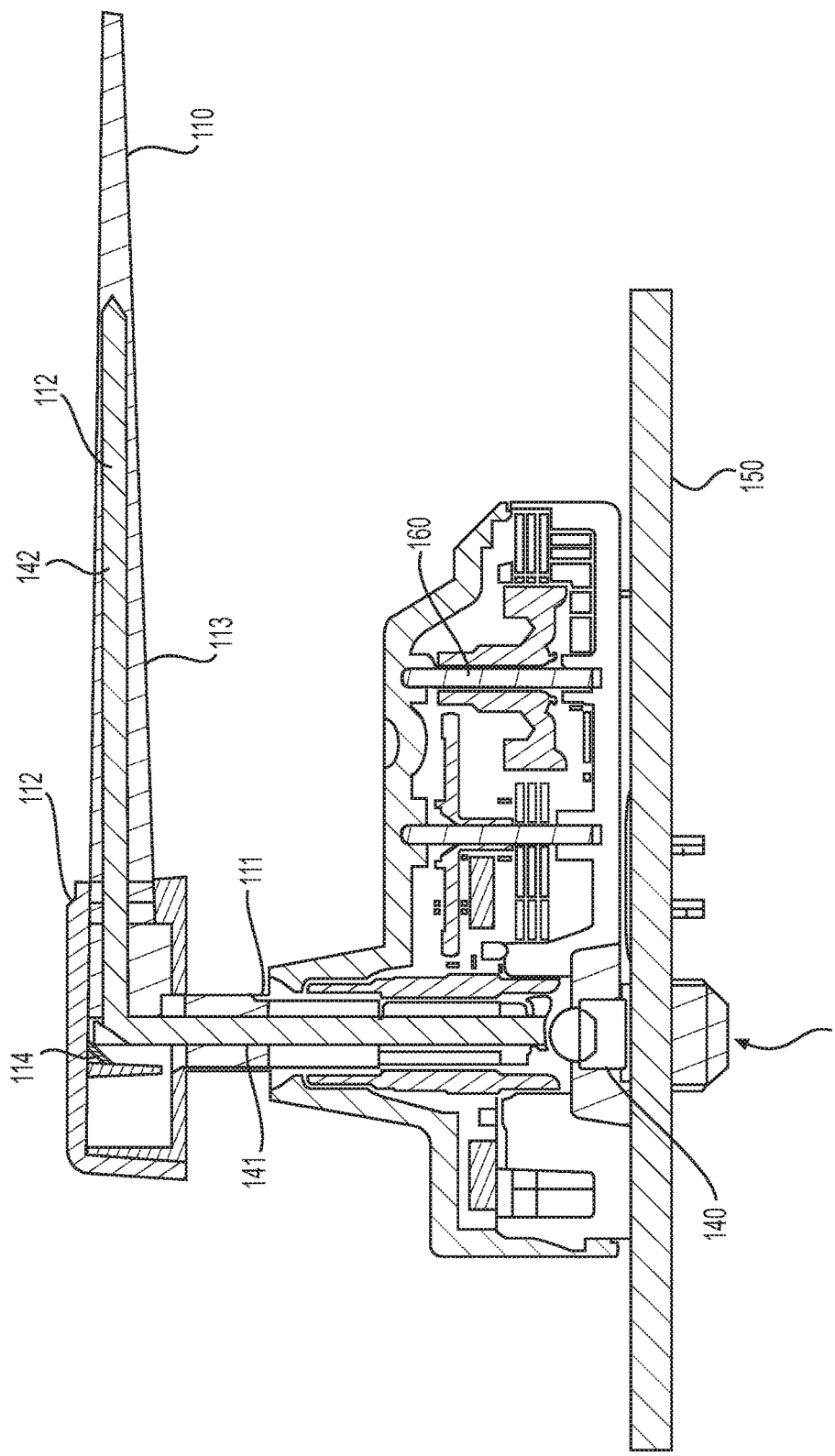
Figure 1C:
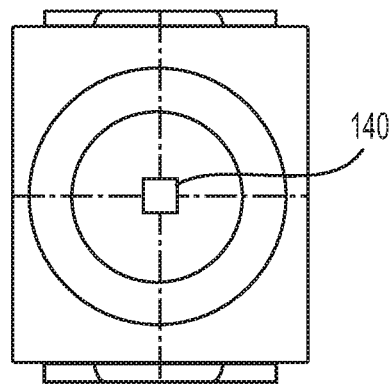

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Disclosed herein are systems, methods, and pointer implementations facilitating double pointer illumination. The aspects disclosed herein employ multi-colored LEDs (for example red, green, and blue (RGB) LED sources), with modifications to a pointer shaft (and in some embodiments, a PCB), to provide pointers with at least two different colored illuminations.

Figure 2:
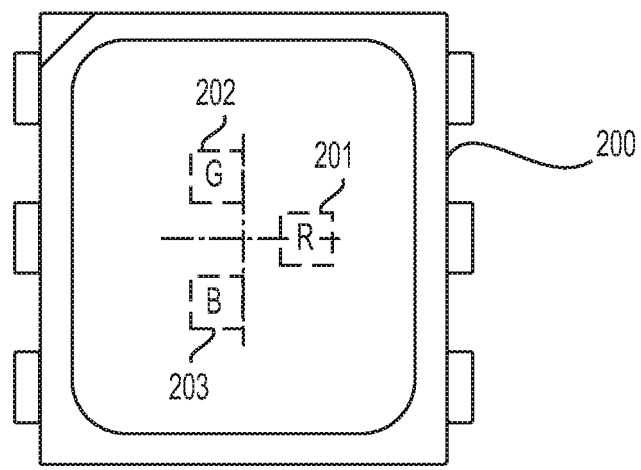
FIG. 2 illustrates a top-view of a RGB LED 200 employed in the various embodiments discussed herein.

FIG. 2 illustrates a top-view of a RGB LED 200 employed in the various embodiments discussed herein. As shown, the RGB LED 200 includes multiple colors, each individually controlled based by an input signal. These are red 201, green 202, and blue 203. The position of the individual colors is exemplary, and may be modified based on an implementer's preference.

Figure 3A:
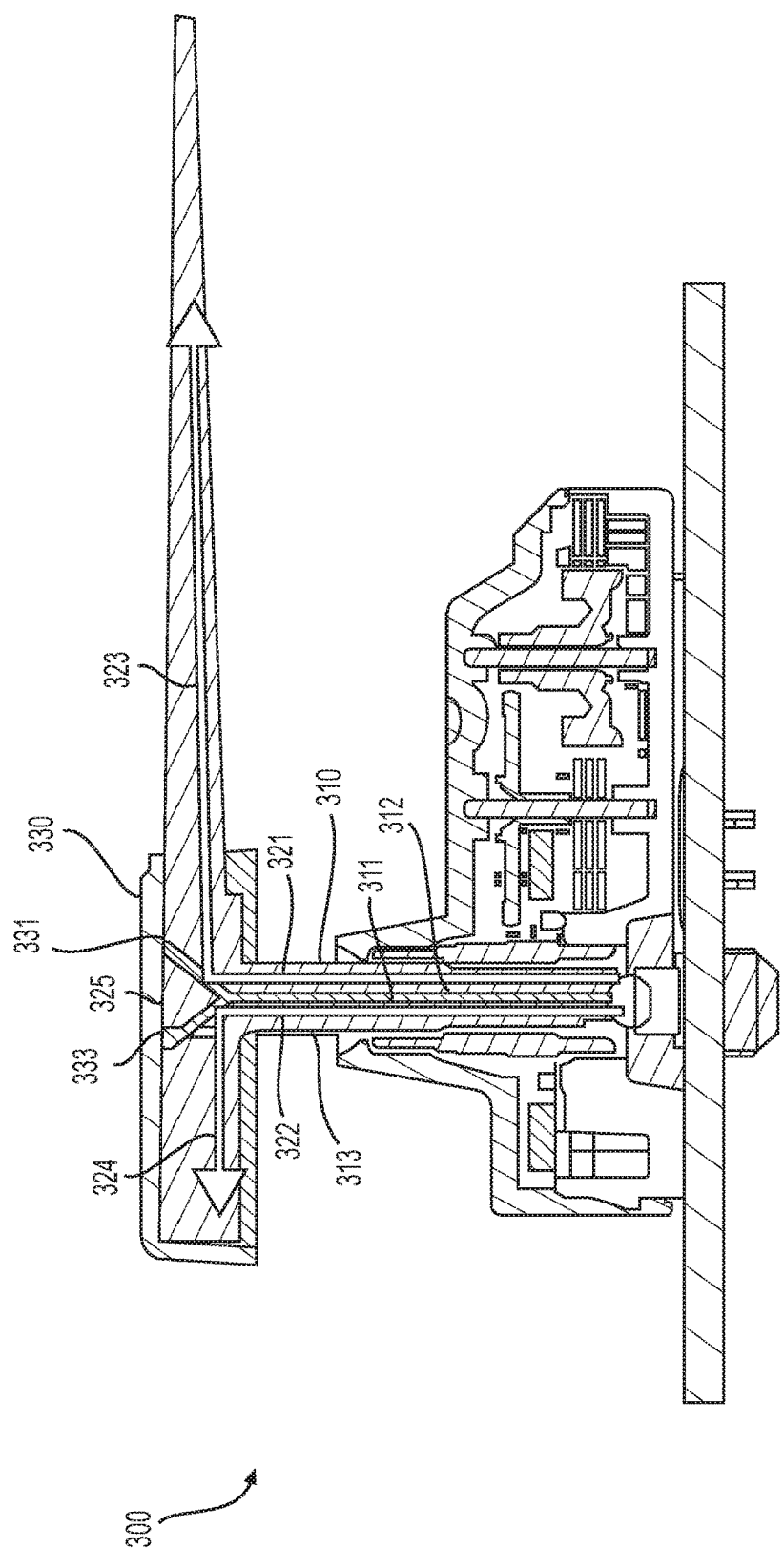
FIGS. 3(a)-(c) illustrates various implementations of the double pointer illumination according to the aspects disclosed herein.
Figure 3B:
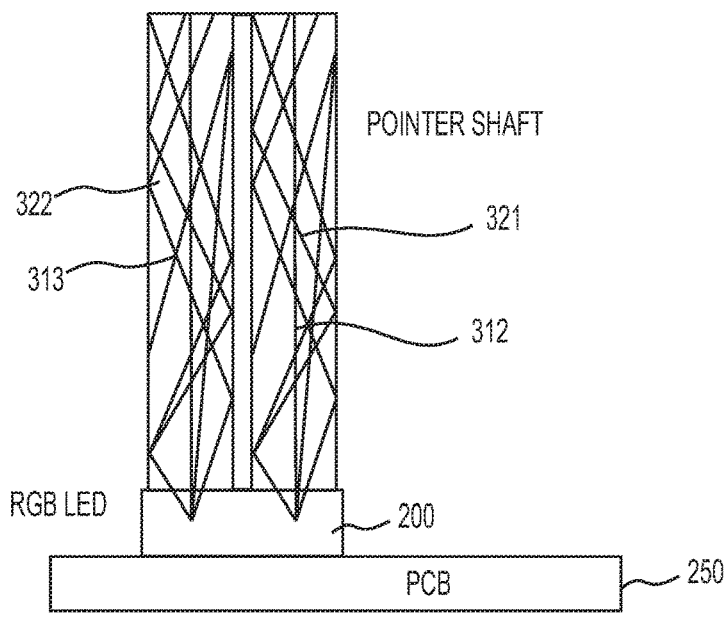
Figure 3C:
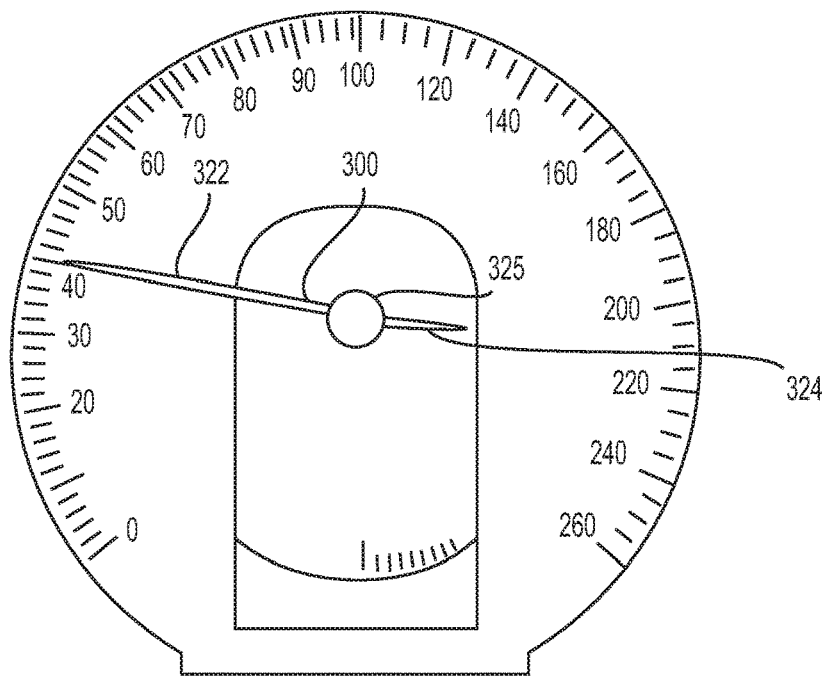

FIGS. 3(a)-(c) illustrates various implementations of the double pointer illumination according to the aspects disclosed herein. FIG. 3(a) illustrates a side-view of the pointer 300 according to the aspects disclosed herein. FIG. 3(b) illustrates an exploded portion of the shaft 310, with a wall 311 included in the shaft 310. The wall 311 may be a black or dark surface that allows an area being segmented to not be affected by light from other areas.

The wall 311 is placed over the RGB LED 200 (and orthogonal to), so that it subdivides a portion of the RGB LED 200. In this way, the pointer shaft 310 has a first portion 312 that allows one color of light 321, and a second portion 313 that allows a second color of light 322 (defined by the wall).

Each beam of light (321 and 322) is reflected off a surface provided within the pointer cap 330 (either the first angled reflective surface 331 or the second angled reflective surface 333). These surfaces are opposite of each other and angled such that the first angled reflective surface cooperates with the first portion or first light guide 312 and is oriented at 90 degrees from the second angled reflective surface that cooperates with the second portion or second light guide 313 to propagate light in a different direction from each other. These surfaces (331 and 333) allow light 321 to be reflected as light 323 (through the pointer stem), and light 322 to be reflected as light 324 (through the pointer tail).

In this manner, and as shown in FIG. 3(c), the pointer 300 is placed on a similar surface as shown in FIG. 1(a). However, a key difference is noted, in that the pointer tail has two visible lights shown that are different colors (light 323 and 324).

Also shown in FIG. 3(c), via the pointer cap 330, is indicia 325. This may be accomplished by providing an applique on the surface of the pointer cap 330 (viewable via the top-view), so that the indicia 325 is only viewable in situations when it is illuminated by light 324. The introduction of this applique is optional.

Figure 4:
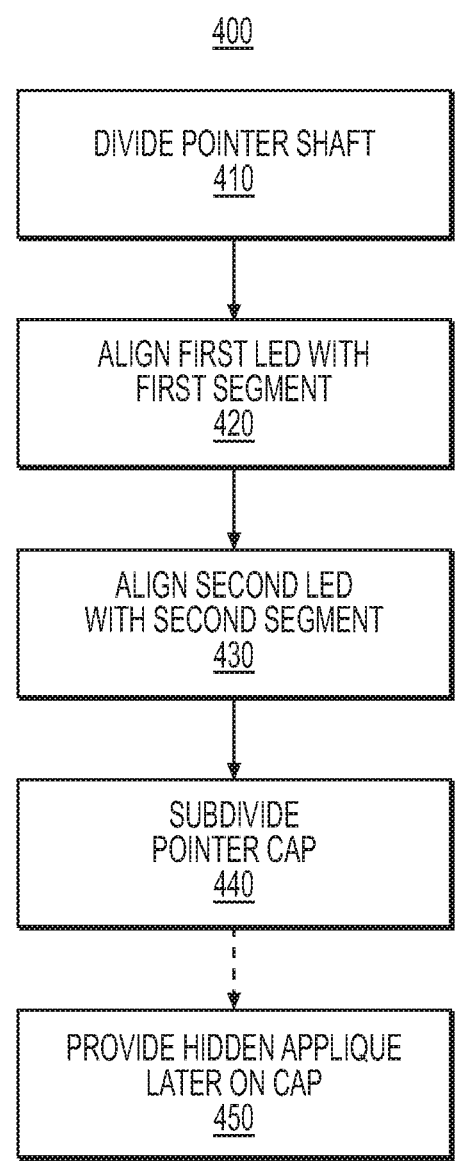
FIG. 4 illustrates a method for implementing the double illumination pointer shown in FIGS. 3(a)-(c)

FIG. 4 illustrates a method 400 for implementing the double illumination pointer shown in FIGS. 3(a)-(c).

In operation 410, the pointer shaft 310 is divided by a wall 311. Thus, the wall 311 creates at least two segmented portions capable of individually providing light (which may correspond to a different color from each other).

In operation 420, the first segment 312 is aligned with a first LED (for example, 201) on a PCB board 250. Conversely, in operation 430, the second segment 313 is aligned with a second LED (for example, 202).

In operation 440, the pointer cap 330 may be subdivided by the angled reflective surfaces (331 and 332) as shown in FIG. 3(a). As explained, in operation 450, a hidden applique 325 may be optionally added to the top portion of the pointer cap 330 (viewable to the viewer of the instrument cluster).

Figure 5:
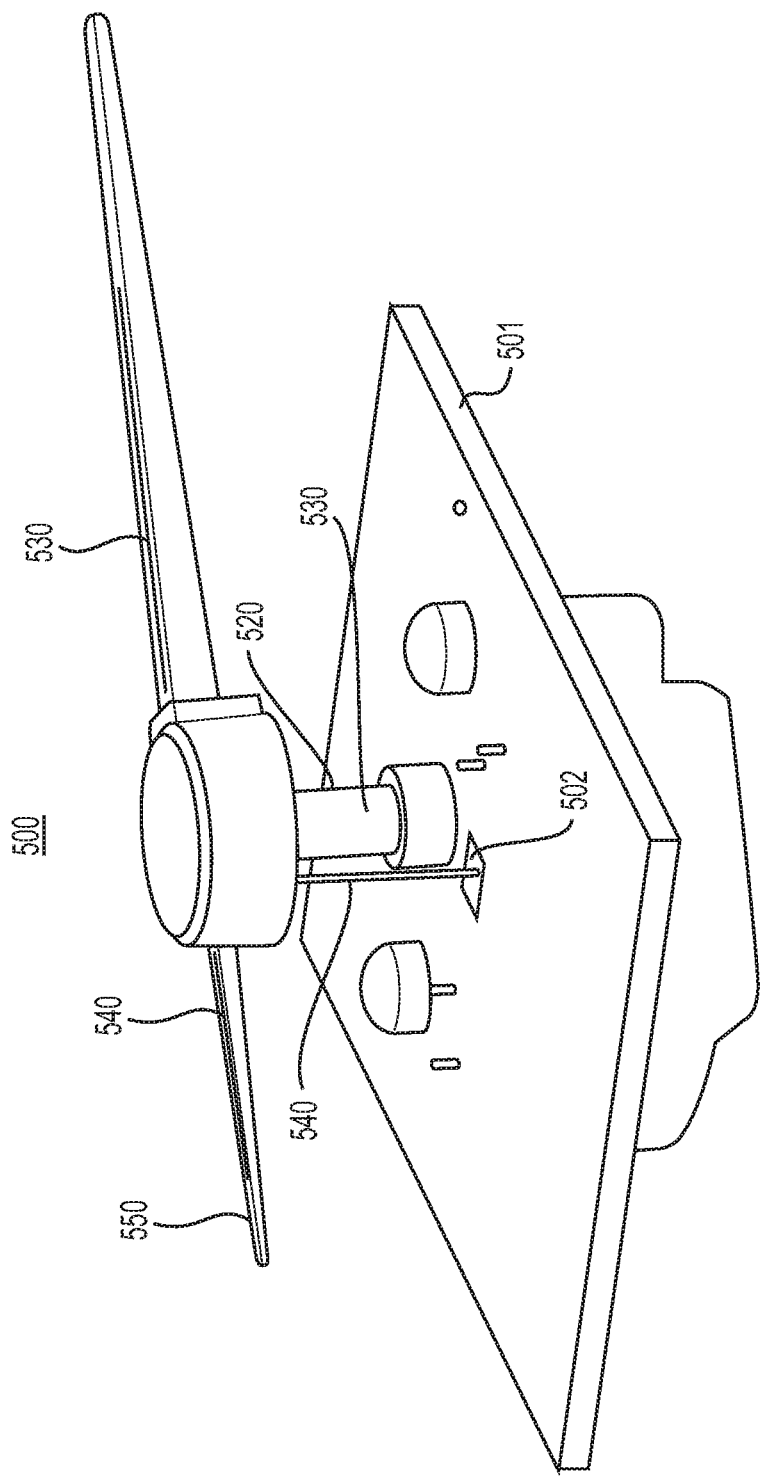
FIG. 5 illustrates a top-view of an implementation of a double pointer illumination employing a pointer with a specific shaft.

FIG. 5 illustrates a top-view of an implementation of a double pointer illumination employing a pointer with a specific shaft. As shown in FIG. 5, there is a specific stepper motor (known as a shaftless stepper motor) being employed. Thus, the concepts discussed in FIGS. 3(a)-(c) are not effective in the implementation disclosed herein.

The pointer 500 is attached to a shaftless stepper motor. In this case, the LEDs are mounted on the non-viewable side of the PCB 501.

Thus, to facilitate this sort of construction, a second light guide 502 is provided through the PCB 501. In this way a first light 530 can be propagated through the central axis 520, and a second light 540 can be propagated through the second light guide 502 (which may be in a rear portion of the pointer tail 550). In this way, the advantages shown in FIGS. 3(a)-(c) may also be achieved.

Figure 6:
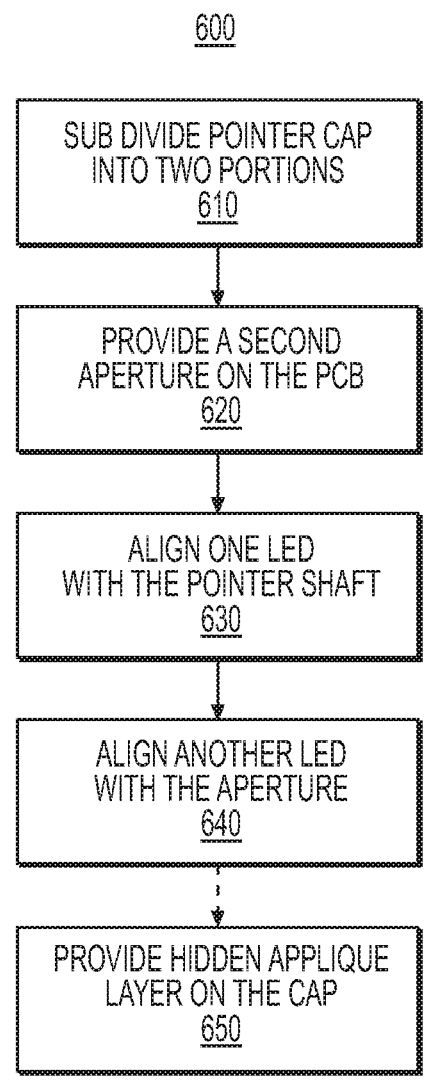
FIG. 6 illustrates a method 600 for implementing the shaftless stepper motor according to the aspects disclosed herein.

FIG. 6 illustrates a method 600 for implementing the shaftless stepper motor according to the aspects disclosed herein.

In operation 610, the pointer cap is sub-divided into two discreet portions, a first portion overlapping with a pointer shaft, and a second portion not overlapping the pointer shaft (as shown in FIG. 5(a)).

In operation 620, a second aperture is provided on the PCB (or PWC). The second aperture is provided additionally to the first aperture. The first aperture being conventionally provided for attachment of the pointer cap with a motor.

In another example, the aperture is not created, and an LED is merely mounted on the PCB.

In operation 630, a first LED is aligned with the pointer shaft, which light being project from the first LED through the first portion of the pointer cap, and through the pointer stem. Conversely, and in operation 640, a second LED is aligned with the second aperture. The second aperture projecting light to the second portion of the pointer cap.

In operation 650, a hidden applique layer may optionally be introduced on the top surface of the pointer cap.

Thus, employing the aspects disclosed herein, a pointer may effectively be provided with a double illumination. Doing so allows for an enhanced user experience and a greater ability to control the dissemination of information through a pointer cap.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. An instrument cluster, comprising:
    a pointer shaft with a hollow portion to propagate light, the pointer shaft being rotate-able around an axis, the pointer shaft having a first end and a second, the first end fitted through a hole in a printed-circuit-board (PCB);
    a wall disposed within the hollow portion of the pointer shaft, the wall bisecting the pointer shaft into a first light guide and a second light guide;
    a pointer cap fitted on the second end of the pointer shaft, the pointer cap having a hidden applique on a surface of the pointer cap, a first angled reflective surface cooperating with the first light guide and a second angled reflective surface cooperating with the second light guide, wherein the first angled reflective surface is oriented at 90 degrees from the second angled reflective surface;
    a pointer tail attached to a first end of the pointer cap and a pointer stem attached to a second end of the pointer cap;
    a light source positioned on the PCB adjacent and orthogonal to the first end of the pointer shaft, wherein the light source generates a first light that is projected through the first light guide in the pointer shaft and a second light that is projected through the second light guide in the pointer shaft, wherein the first light that is projected through the first light guide is reflected off the first angled reflective surface of the pointer cap and through the pointer tail, the second light that is projected through the second light guide is reflected off the second angled reflective surface of the pointer cap through the pointer stem, and the hidden applique being illuminated by only one of the first light and the second light generated by the light source.

2. The instrument cluster according to claim 1, wherein a stepper motor drives the pointer shaft.

3. The instrument cluster according to claim 1, wherein the first light and the second light generated by the light source are different colors.

4. The instrument cluster according to claim 1, wherein the light source further comprises a multi-colored light emitting diode (LED) installed on the PCB, wherein the first light is generated from a first color installed on the LED and the second light is generated from a second color installed on the LED.

5. The instrument cluster according to claim 4, wherein the first light guide is aligned with the first color of the LED light source and the second light guide is aligned with the second color of the LED light source.

6. A shaft-less instrument cluster, comprising:
a pointer cap fitted on a stepper motor, the pointer cap on one surface of a printer-circuit-board (PCB) and the stepper motor on an opposing surface of the PCB;
a pointer tail attached to a first end of the pointer cap and a pointer stem attached to a second end of the pointer cap;
wherein a first light is projected through a first cavity of the pointer cap, and a second light is projected through a second cavity formed by a cylindrical structure that attaches the pointer cap to the stepper motor.

7. The instrument cluster according to claim 6, further comprising a hidden applique on a surface of the pointer cap, the hidden applique being illuminated by only one of the first light and the second light.

8. The instrument cluster according to claim 6, wherein the first light and the second light are different colors.

9. The instrument cluster according to claim 6, further comprise a multi-colored light emitting diode (LED) installed on the PCB, wherein the first light is generated from a first color installed on the LED and the second light is generated from a second color installed on the LED.

10. The instrument cluster according to claim 9, wherein the first cavity is aligned with the first color and the second cavity is aligned with the second color.

11. The instrument cluster according to claim 10, wherein PCB includes a first aperture for the first color and a second aperture for the second color.

12. The instrument cluster according to claim 11, wherein the first aperture is aligned under the pointer cap, and the second aperture is defined by where the pointer cap is attached to the stepper motor.

13. An instrument cluster comprising:
a surface incorporating a digital display and defining at least one circular plane;
a pointer cap fitted on a stepper motor, wherein the pointer cap is disposed on one surface of a printer-circuit-board (PCB) and the stepper motor is disposed on an opposing surface of the PCB;
a pointer tail attached to a first end of the pointer cap and a pointer stem attached to a second end of the pointer cap, wherein the pointer tail and the pointer stem are disposed adjacent the at least one circular plane of the surface and rotate-able around and axis in the center of the at least one circular plane;
a structure attaching the pointer cap and the stepper motor;
at least one light source cooperating with the pointer cap, wherein the at least one light source generates a first light that is projected through a first cavity of the pointer cap to the pointer tail attached to the first end of the pointer cap, and generates a second light that is projected through a second cavity formed in the structure attaching the pointer cap to the stepper motor to the pointer stem attached to the second end of the pointer cap.

14. The instrument cluster according to claim 13, further comprising a hidden applique on a surface of the pointer cap, the hidden applique being illuminated by only one of the first light and the second light generated by the at least one light source.

15. The instrument cluster according to claim 13, wherein at least one light source further comprises a first LED to generate the first light that is projected through the first cavity of the pointer cap to the pointer tail attached to the first end of the pointer cap and a second LED to generate the second light that is projected through the second cavity formed in the structure attaching the pointer cap to the stepper motor to the pointer stem attached to the second end of the pointer cap.

16. The instrument cluster according to claim 15, wherein the first light generated by the first LED and the second light generated by the second LED are different colors.

17. The instrument cluster according to claim 16, wherein the first cavity is aligned with the first LED and the second cavity is aligned with the second LED.

18. The instrument cluster according to claim 17, wherein PCB includes a first aperture corresponding to and cooperating with the first LED a second aperture corresponding to and cooperating with the second LED.

19. The instrument cluster according to claim 18, wherein the first aperture is aligned under the pointer cap, and the second aperture is defined by where the pointer cap is attached to the stepper motor.

20. The instrument cluster according to claim 13, wherein the at least one light source further comprises a multi-colored light emitting diode (LED) installed on the PCB, wherein the first light is generated from a first color installed on the LED and the second light is generated from a second color installed on the LED.

* * * * *